United States Patent
Govind Km

(10) Patent No.: US 10,148,420 B2
(45) Date of Patent: Dec. 4, 2018

(54) SERIAL DATA COMMUNICATIONS USING A UART MODULE AND METHOD THEREFOR

(71) Applicant: NXP B.V., Eindhoven (NL)

(72) Inventor: Kanal Govind Km, Payyanur (IN)

(73) Assignee: NXP B.V., Eindhoven (NL)

( * ) Notice: Subject to any disclaimer, the term of this patent is extended or adjusted under 35 U.S.C. 154(b) by 22 days.

(21) Appl. No.: 15/363,929

(22) Filed: Nov. 29, 2016

(65) Prior Publication Data

US 2018/0152287 A1  May 31, 2018

(51) Int. Cl.
*H04L 7/04* (2006.01)
*G06F 13/38* (2006.01)
*H04L 5/16* (2006.01)

(52) U.S. Cl.
CPC ............ *H04L 7/044* (2013.01); *G06F 13/385* (2013.01); *H04L 5/16* (2013.01)

(58) Field of Classification Search
CPC  G06F 13/385; G06F 13/105; H04M 1/72527; H04Q 9/00
See application file for complete search history.

(56) References Cited

U.S. PATENT DOCUMENTS

| | | | |
|---|---|---|---|
| 6,199,764 B1 | 3/2001 | Tsai | |
| 6,470,404 B1 | 10/2002 | Kim | |
| 9,860,093 B2 * | 1/2018 | Burns | ...................... H03K 7/06 |
| 2013/0064321 A1 | 3/2013 | Kopp | |

FOREIGN PATENT DOCUMENTS

| | | |
|---|---|---|
| CN | 101146090 A | 3/2008 |
| CN | 101833533 A | 9/2010 |
| CN | 103605306 A | 2/2014 |
| EP | 0605751 A1 | 7/1994 |

OTHER PUBLICATIONS

ISO/IEC, "International Standard ISO/IEC 7816-3", Third Edition, 2006, 58 pages.

* cited by examiner

*Primary Examiner* — Chandrahas B Patel
(74) *Attorney, Agent, or Firm* — Daniel D. Hill

(57) ABSTRACT

A data processing system includes a universal asynchronous receive/transmit (UART) module and timer module. The UART module has a first input terminal for receiving an input clock signal, a second input terminal for receiving a receive data signal, and an output terminal for providing a transmit data signal. The receive data signal and the transmit data signal use a baud rate based clock signal determined using the input clock signal, and wherein the output terminal and the second input terminal are coupled together for communicating data with a universal synchronous asynchronous receiver/transmitter (USART) module. The timer module is coupled to receive the input clock signal. The timer module provides a duplicate baud rate clock signal for communication to the USART module. The duplicate baud rate clock signal is substantially the same as the baud rate based clock signal.

18 Claims, 5 Drawing Sheets

SERIAL DATA COMMUNICATIONS USING A UART MODULE AND METHOD THEREFOR

BACKGROUND

Field

This disclosure relates generally to communications, and more specifically, to serial data communications and method therefor.

Related Art

A universal synchronous asynchronous receiver/transmitter, abbreviated USART, is a hardware module of a data processing system that translates data between parallel and serial forms. The USART module contains clock and data lines for transferring data between a master and a slave. The USART module operates in two modes, synchronous and asynchronous. Synchronous mode is used for transferring block data at high speed. Transferring data synchronously requires a clock signal. Data is transferred asynchronously without using a clock signal. In addition to synchronous and asynchronous data transfer, the data transfer can be half duplex or full duplex. The full duplex data transmission uses dedicated transmit and receive lines for transmission and reception of data, respectively, whereas half duplex uses a single line for transmission and reception.

A universal asynchronous receiver/transmitter, abbreviated UART, is similar to USART, but the UART does not have a clock line for data transmission. Instead of outputting a clock signal, a UART module uses baud rate for asynchronous data transmission. Many data processing systems have a UART module but no USART module. However, it is possible to interface a UART module with a USART module using software, sometimes called "bit banging".

Using bit banging, software directly sets and samples the state of pins on the processor, and software is responsible for all parameters of the signal, such as timing, signal level, synchronization, etc. However, the use of software adds overhead to the processing load. Hence there exist a need for a better USART/UART interface.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
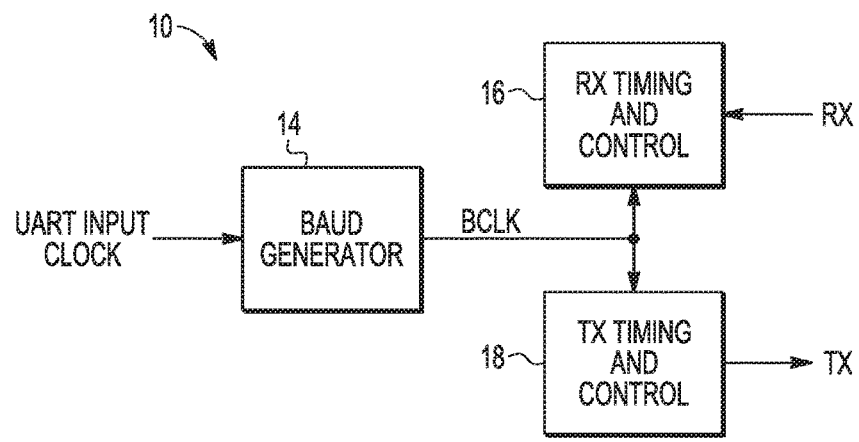
FIG. 1 illustrates a simplified block diagram of a UART module in accordance with the prior art.

Generally, there is provided, a data processing system that provides half-duplex asynchronous USART communication using a UART module and a timer module of the data processing system. In the UART module, the transmit terminal and the receive terminal are coupled together to transmit a data signal. The timer module is used to provide a USART clock signal from a UART clock generator. A baud generator of the UART module produces the correct baud rate for the desired clock frequency. In another embodiment, a synchronous USART transmission mode is provided using the UART module and the timer module.

In one embodiment, there is provided, a data processing system comprising: a universal asynchronous receive/transmit (UART) module having a first input terminal for receiving an input clock signal, a second input terminal for receiving a receive data signal, and an output terminal for providing a transmit data signal, wherein the receive data signal and the transmit data signal use a baud rate based clock signal determined using the input clock signal, and wherein the output terminal and the second input terminal are coupled together for communicating data with a universal synchronous asynchronous receiver/transmitter (USART) module; and a timer module coupled to receive the input clock signal, the timer module for providing a duplicate baud rate clock signal for being communicated to the USART module, wherein the duplicate baud rate clock signal is substantially the same as the baud rate based clock signal. The baud rate may be determined based on the duplicate baud rate clock signal. The data processing system may be implemented on an integrated circuit. The UART module may communicate data with the USART module in a half-duplex asynchronous USART mode. The data processing system may further comprise a control register in the UART module having a start bit and a stop bit, and wherein disabling the start bit and the stop bit may allow a synchronous USART communication mode between the UART module and the USART module. The data processing system may further comprise a coupling element for selectively coupling the second input terminal with the output terminal for operation in the half-duplex asynchronous communication mode, and for selectively decoupling the second input terminal from the output terminal for communication in a UART communication mode. The UART module may further comprise a data reception portion and a data transmission portion, wherein the data reception portion is disabled during data transmission from the UART module, and wherein data transmission portion is disabled during data reception in the UART module.

In another embodiment, there is provided, a data processing system comprising: a universal asynchronous receive/transmit (UART) module having a first input terminal arranged to receive an input clock signal, a second input terminal arranged to receive a receive data signal, and an output terminal arranged to provide a transmit data signal, wherein the receive data signal and the transmit data signal use a baud rate based clock signal determined using the input clock signal, and wherein the output terminal and the second input terminal are coupled together for communicating data with a universal synchronous asynchronous receiver/transmitter (USART) module; and a timer module coupled to receive the input clock signal, the timer module arranged to provide a duplicate baud rate clock signal for communication to the USART module, wherein the duplicate baud rate clock signal is substantially the same as the baud rate based clock signal, and wherein the UART module may communicate in one of a half-duplex asynchronous USART mode and a synchronous USART communication mode. The baud rate may be determined based on the duplicate baud rate clock signal. The data processing system may be implemented on a single integrated circuit. The data processing system may further comprise a control register in the UART module having a start bit and a stop bit, and wherein disabling the start bit and the stop bit allows the synchronous USART communication mode between the UART module and the USART module. The data processing system may further comprise a coupling element for selectively coupling the second input terminal with the output terminal for operation in the half-duplex asynchronous communication mode, and for selectively decoupling the second input terminal from the output terminal for communication in a UART communication mode. The UART module may further comprise a data reception portion and a data transmission portion, wherein the data reception portion is disabled during data transmission from the UART module, and wherein data transmission portion is disabled during data reception in the UART module.

In yet another embodiment, there is provided, a method for communicating data between a first device having a universal asynchronous receive/transmit (UART) module and a second device having a universal synchronous asynchronous receiver/transmitter (USART) module, the method comprising: initializing a clock signal for use by the UART module based on the USART module clock frequency; initializing a baud rate clock for the UART module based on the initialized clock signal; coupling a UART transmit terminal and a UART receive terminal together for communicating with a data terminal of the USART module; duplicating the baud rate clock for transmission to a clock terminal of the USART module; and transmitting data between the UART module and the USART module. The first device may be a data processor. The data processor may be implemented on a single integrated circuit. The method may further comprise enabling a half-duplex asynchronous USART mode of the UART module by enabling start and stop bits in a UART control register. The method may further comprise enabling a synchronous USART communication mode in the UART module by disabling start and stop bits in a UART control register. Coupling a UART transmit terminal and a UART receive terminal together may further comprise using a coupling element to selectively couple the transmit terminal and the UART receive terminal together in response to a control signal. The coupling element may be characterized as being a switch.

FIG. 1 illustrates a simplified block diagram of a UART module 10 in accordance with the prior art. UART module 10 includes a baud generator 14, receive (RX) timing and control block 16, and transmit (TX) timing and control block 18. Baud generator 14 has an input terminal for receiving a UART input clock, and an output terminal for providing an internal baud rate clock signal labeled BCLK. Receive timing and control block 16 has an input terminal for receiving the baud rate clock signal BCLK, and an input terminal labeled RX for receiving a data signal. Transmit timing and control block 18 has an input terminal for receiving the baud rate clock signal BCLK, and an output terminal labeled TX for providing transmit data. As provided, UART module 10 can only communicate an asynchronous UART signal with another UART module.

Many systems, such as intelligent transportation systems (ITS) provide services relating to different modes of transport and traffic management. Many transportation systems involve safety and security with a secure element. This secure element will connect to through smart card standard ISO7816-3 USART. The ISO 7816-3 USART standard uses half duplex asynchronous USART for transferring data between the secure element and a host controller. However, many of the microcontrollers used in automotive systems have one or more UART modules and do not have a USART module.

Figure 2:
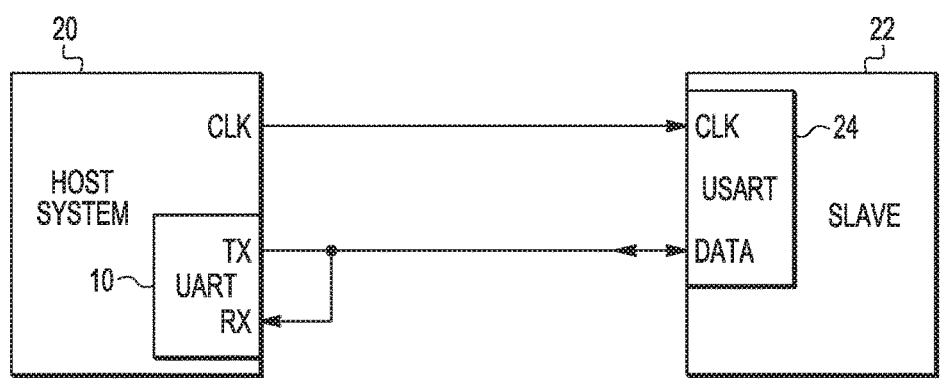
FIG. 2 illustrates a simplified block diagram of a processor with a UART module interfaced with a processor having a USART module in accordance with an embodiment.

FIG. 2 illustrates a simplified block diagram of data processing system 20 with UART module 10 interfaced with data processing system 22 having USART module 24 in accordance with an embodiment. In the system illustrated in FIG. 2, processor 20 is a host processor and processor 22 is a slave processor. In UART module 10, a transmit terminal and a receive terminal are coupled together, and then coupled to the data terminal DATA of USART module 24. When UART module 10 is transmitting data to USART module 24, the UART receiver portion is disabled. When UART module 10 is receiving data from the USART module of another device, the transmitter portion of UART module 10 is disabled. Processor 20 is configured to provide a clock signal at an output terminal labeled CLK to be transmitted to a clock terminal CLK of USART module 24. The baud rate of UART 10 is adjusted to provide a data signal at the same frequency as the clock signal at clock terminal CLK. More details of the illustrated embodiments will be discussed below.

Figure 3:
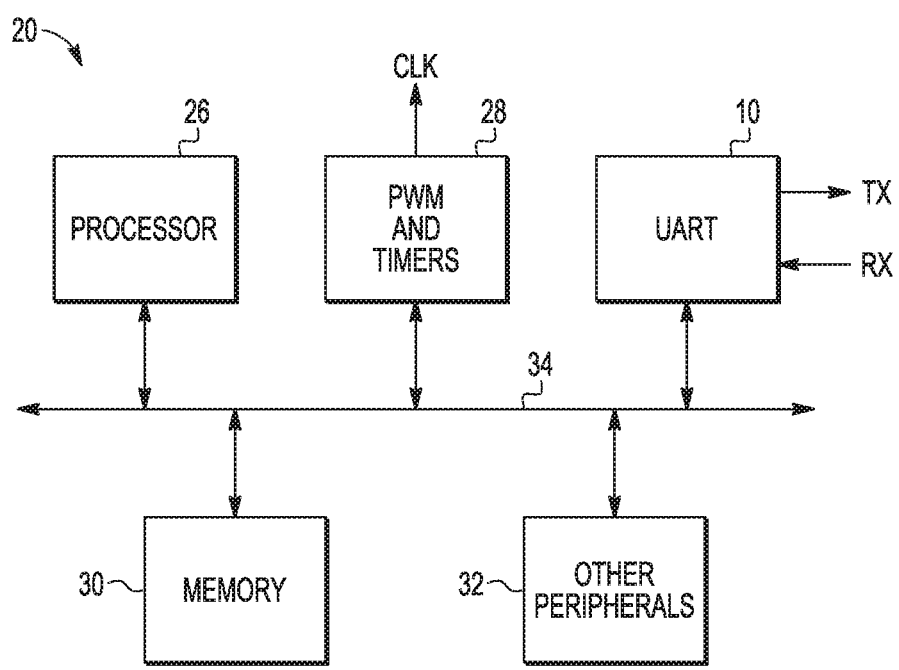
FIG. 3 illustrates the data processing system of FIG. 2 in accordance with an embodiment.

FIG. 3 illustrates data processing system 20 of FIG. 2 in accordance with an embodiment. In one embodiment, data processing system 20 includes processor 26, clocks and timers block 28, UART 10, memory 20, and other peripherals 32 all bi-directionally connected to a bus 34. Data processing system 20 may be implemented on a single integrated circuit.

Bus 34 can be any type of bus for communicating any type of information such as data, address, or instructions. Processor 26 may be any type of microprocessor (MPU), microcontroller (MCU), digital signal processor (DSP), or other type of processing core. There may be multiple processors like processor 26. Clocks and timers block 28 may include one or more clock generator and/or timer modules for providing control and timing for a variety of applications. Memory 30 may be shared between the other blocks and modules of FIG. 3 or between multiple processors. Memory 30 may be any type of volatile or non-volatile memory, such as static random access memory (SRAM), dynamic random access memory (DRAM), flash, etc. Other peripherals 32 may include circuits for providing specific functionally to processing system 10, such as for example, additional memories, a direct memory access (DMA) controller, a debug module, arbitration circuits, power management circuits, communication circuits, etc.

Figure 4:
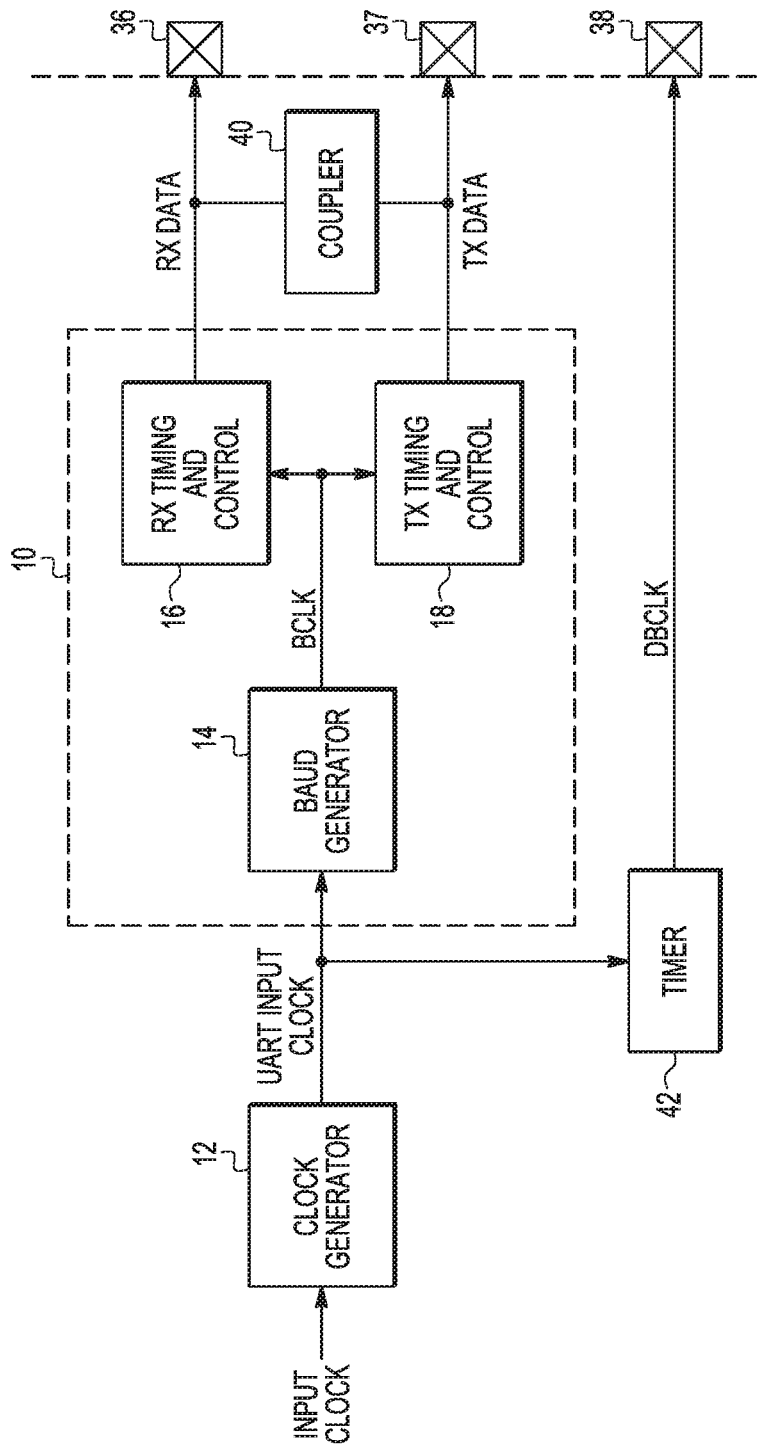
FIG. 4 illustrates a portion of the data processing system of FIG. 3 in accordance with an embodiment.

FIG. 4 illustrates a portion of data processing system 20 of FIG. 3 in accordance with an embodiment. The portion of data processing system 20 includes UART 10, clock generator 12, coupler 40, and timer 42. Clock generator 12 has an input terminal for receiving an input clock labeled INPUT CLOCK, and an output terminal for providing a clock signal labeled UART INPUT CLOCK. The illustrated embodiment provides half-duplex asynchronous communication to a USART module in another device as illustrated in FIG. 2. In one embodiment, clock generator 12 may be a clock generator from clocks and timers block 28. Baud generator 14 is programmable and divides the UART INPUT CLOCK by a programmable divisor to produce internal baud clock BCLK. Timer 42 has an input terminal connected to the output terminal of clock generator 12 for receiving clock signal UART INPUT CLOCK, and an output terminal for providing a clock signal labeled DBCLK to output terminal 38. Clock signal DBCLK is substantially the same as BCLK from baud generator 14 illustrated in FIG. 1. Coupler 40 is coupled between terminals 36 and 37.

Coupler 40 can be any device or element for coupling terminals 36 and 37 together. For example, in one embodiment, coupler 40 is a jumper wire connection, or equivalent, between terminals 36 and 37. In another embodiment, coupler 40 may be a switch controlled by a control signal. Note that terminals 36, 37, and 38 are on a dashed line for illustrating a boundary of data processing system 20.

In operation, UART module 10 is configured to communicate data to/from a USART module as illustrated in FIG. 2. Coupler 40 provides an electrical connection between terminal 36 and terminal 37. When UART module 10 is transmitting data to the USART module of another device, receiver timing is disabled by control module 16. When UART module 10 is receiving data from the USART module of another device, transmitter timing is disabled by control module 18. This prevents receipt of an echo message from the module not being used. A clock frequency is determined for clock signal BCLK and clock signal DBCLK based on the clock signal frequency required by the USART module in another device, such as for example, slave device 22 in FIG. 2. Clock generator 12 is set up to provide clock signal UART INPUT CLOCK at an appropriate frequency. Baud generator 14 will determine the baud rate and provide internal clock signal BCLK at the frequency required to establish the baud rate. Timer 42 receives clock signal UART INPUT CLOCK and provides duplicate clock signal DBCLK at a frequency that matches the baud rate and the clock signal frequency of the USART module. A baud rate represents the number of bits that are transmitted for a period of 1 second. Dividing one second by the baud rate provides the clock period T, where Frequency equals 1/T. As an example, assume a baud rate of 9600. T=1/9600=0.104 milliseconds (mS).

$$F=1/T=1/0.104 \text{ mS}=9.6 \text{ kilo Hertz (kHz)}$$

Therefore, clock signal BCLK is set at 9.6 kHz by baud generator 14 and clock signal DBCLK is set to 9.6 KHZ by timer 42. Data is transmitted at a baud rate of 9600 while the clock signal is transmitted by timer 42 at 9.6 kHz. Because clock signals BCLK and DBCLK are based on the same clock signal (UART INPUT CLOCK), clock signals BCLK and DBCLK are substantially phase aligned with each other. During communication, timer 42 will provide clock signal DBCLK to the USART via terminal 38. Using the UART module 10 and timer 42 as described allows half-duplex asynchronous data communication with a USART module, without using bit banging.

Figure 5:
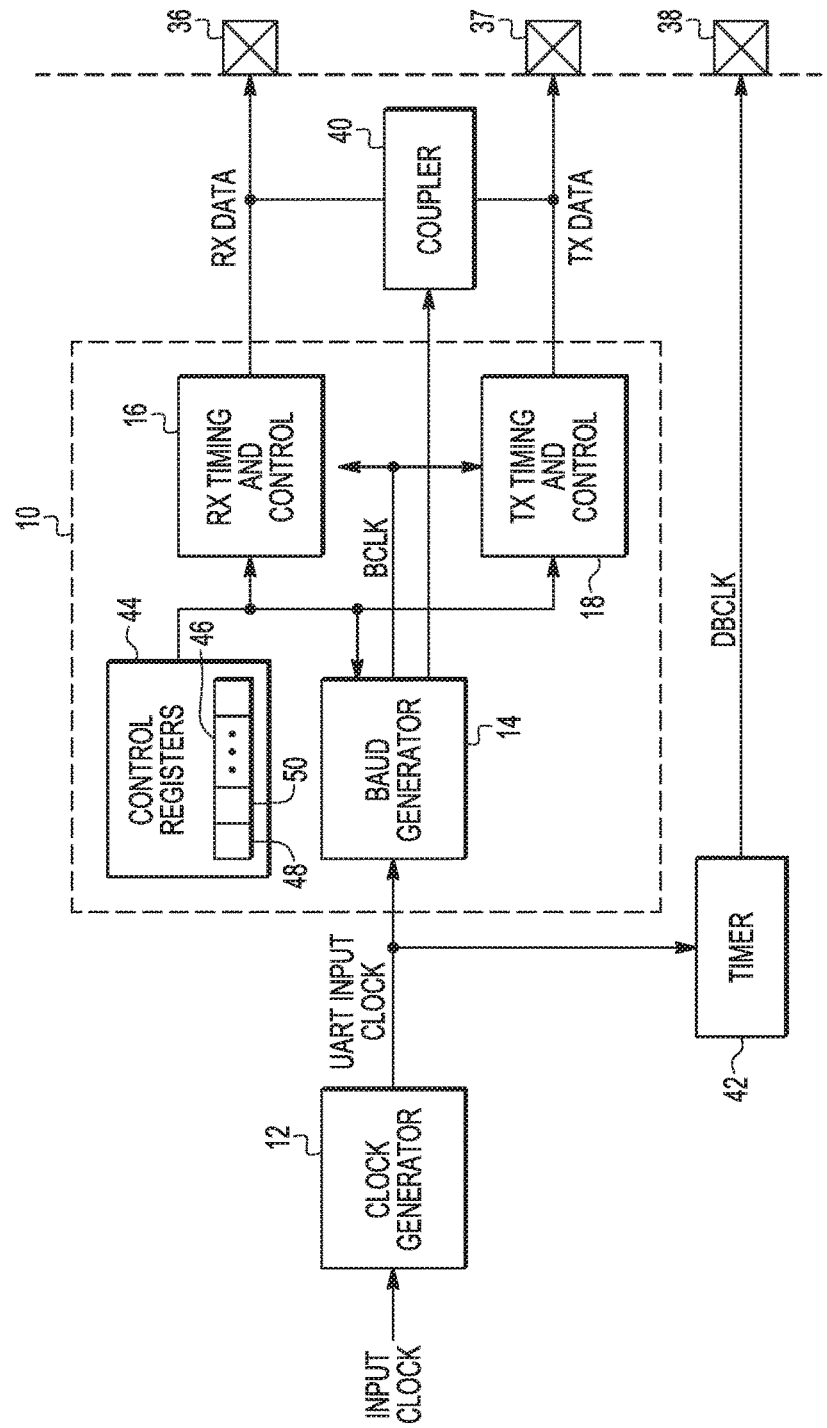
FIG. 5 illustrates a portion of the data processing system of FIG. 3 in accordance with another embodiment.

FIG. 5 illustrates a portion of the data processing system 20 of FIG. 3 in accordance with another embodiment. The embodiment of FIG. 5 is the same as FIG. 4 except that FIG. 5 also includes control registers 44 having a plurality of control bits 46. Control registers 44 are connected to provide control information to baud generator 14, receiver timing and control 16, transmitter timing and control 18, and coupler 40. Two of the control bits are start and stop bits 48 and 50, respectively. The start and stop bits are used by UART to mark the beginning and ending of a frame of data to be asynchronously communicated by UART module 10. By disabling the start and stop bits, the embodiment of FIG. 5 is able to provide a synchronous USART communication mode in addition to the half-duplex asynchronous USART communication mode. Also, in one embodiment, a control signal may be used to electrically decouple coupler 40 so that UART module 10 can communicate as a normal UART module.

Figure 6:
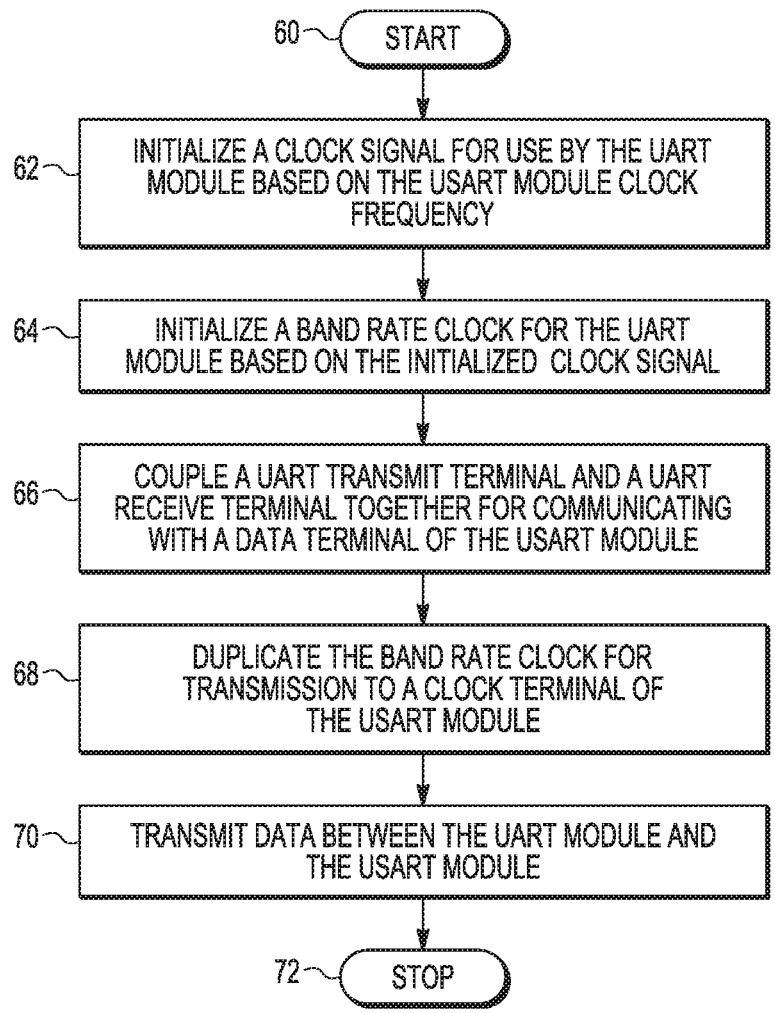
FIG. 6 illustrates a method for communicating data between a first device have a UART module and a second device having a USART module.

FIG. 6 illustrates a method for communicating data between a first device having a UART module and a second device having a USART module. Referring to both FIG. 6 and FIG. 4, the method begins at step 60. At step 62, a clock signal for use by the UART module is initialized based on the USART module clock frequency. At step 64, a baud rate of the UART module is initialized by baud generator 14 based on the clock signal initialized at step 62. At step 66, a UART transmit terminal 37 and a UART receive terminal 36 are coupled together for communicating with the DATA terminal of the USART module. At step 68, the baud rate clock in the UART module is duplicated in timer module 42 for transmission to the clock terminal of the USART module. At step 70, data is transmitted between the UART module and the USART module. The method ends at step 72.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
    a universal asynchronous receive/transmit (UART) module having a first input terminal for receiving an input clock signal, a second input terminal for receiving a receive data signal, and an output terminal for providing a transmit data signal, wherein the receive data signal and the transmit data signal use a baud rate based clock signal determined using the input clock signal, and wherein the output terminal and the second input terminal are coupled together for communicating data with a universal synchronous asynchronous receiver/transmitter (USART) module;
    a control register in the UART module having a start bit and a stop bit, and wherein disabling the start bit and the stop bit allows a synchronous USART communication mode between the UART module and the USART module; and a timer module coupled to receive the input clock signal, the timer module for providing a duplicate baud rate clock signal for being communicated to the USART module, wherein the duplicate baud rate clock signal is substantially the same as the baud rate based clock signal.

2. The data processing system of claim 1, wherein the baud rate is determined based on the duplicate baud rate clock signal.

3. The data processing system of claim 1, wherein the data processing system is implemented on an integrated circuit.

4. The data processing system of claim 1, wherein the UART module communicates data with the USART module in a half-duplex asynchronous USART mode when the start bit and the stop bit are enabled.

5. The data processing system of claim 1, wherein the UART module further comprises a data reception portion and a data transmission portion, wherein the data reception portion is disabled during data transmission from the UART module, and wherein data transmission portion is disabled during data reception in the UART module.

6. The data processing system of claim 1, further comprising a coupling element for selectively coupling the second input terminal with the output terminal for operation in the half-duplex asynchronous communication mode, and for selectively decoupling the second input terminal from the output terminal for communication in a UART communication mode.

7. A data processing system comprising:

a universal asynchronous receive/transmit (UART) module having a first input terminal arranged to receive an input clock signal, a second input terminal arranged to receive a receive data signal, and an output terminal arranged to provide a transmit data signal, wherein the receive data signal and the transmit data signal use a baud rate based clock signal determined using the input clock signal, and wherein the output terminal and the second input terminal are coupled together for communicating data with a universal synchronous asynchronous receiver/transmitter (USART) module; and a timer module coupled to receive the input clock signal, the timer module arranged to provide a duplicate baud rate clock signal for communication to the USART module, wherein the duplicate baud rate clock signal is substantially the same as the baud rate based clock signal, and wherein the UART module may communicate in one of a half-duplex asynchronous USART mode and a synchronous USART communication mode.

8. The date processing system of claim 7, wherein the UART module further comprises a data reception portion and a data transmission portion, wherein the data reception portion is disabled during data transmission from the UART module, and wherein data transmission portion is disabled during data reception in the UART module.

9. The data processing system of claim 7, wherein the baud rate is determined based on the duplicate baud rate clock signal.

10. The data processing system of claim 7, wherein the data processing system is implemented on a single integrated circuit.

11. The data processing system of claim 7, further comprising a control register in the UART module having a start bit and a stop bit, and wherein disabling the start bit and the stop bit allows the synchronous USART communication mode between the UART module and the USART module.

12. The data processing system of claim 7, further comprising a coupling element for selectively coupling the second input terminal with the output terminal for operation in the half-duplex asynchronous communication mode, and for selectively decoupling the second input terminal from the output terminal for communication in a UART communication mode.

13. A method for communicating data between a first device having a universal asynchronous receive/transmit (UART) module and a second device having a universal synchronous asynchronous receiver/transmitter (USART) module, the method comprising:

initializing a clock signal for use by the UART module based on the USART module clock frequency;

initializing a baud rate clock for the UART module based on the initialized clock signal;

enabling a half-duplex asynchronous USART mode of the UART module by enabling start and stop bits in a UART control register;

coupling a UART transmit terminal and a UART receive terminal together for communicating with a data terminal of the USART module;

duplicating the baud rate clock for transmission to a clock terminal of the USART module; and transmitting data between the UART module and the USART module.

14. The method of claim 13, further comprising enabling a synchronous USART communication mode in the UART module by disabling the start and stop bits in the UART control register.

15. The method of claim 13, the first device is a data processor.

16. The method of claim 15, wherein the data processor is implemented on a single integrated circuit.

17. The method of claim 13, wherein coupling a UART transmit terminal and a UART receive terminal together further comprises using a coupling element to selectively couple the transmit terminal and the UART receive terminal together in response to a control signal.

18. The method of claim 17, wherein the coupling element is characterized as being a switch.

* * * * *